March 17, 1931.  V. KENEY  1,796,997
COMBINED EYE AND EYELASHES FOR DOLLS
Filed Feb. 20, 1930
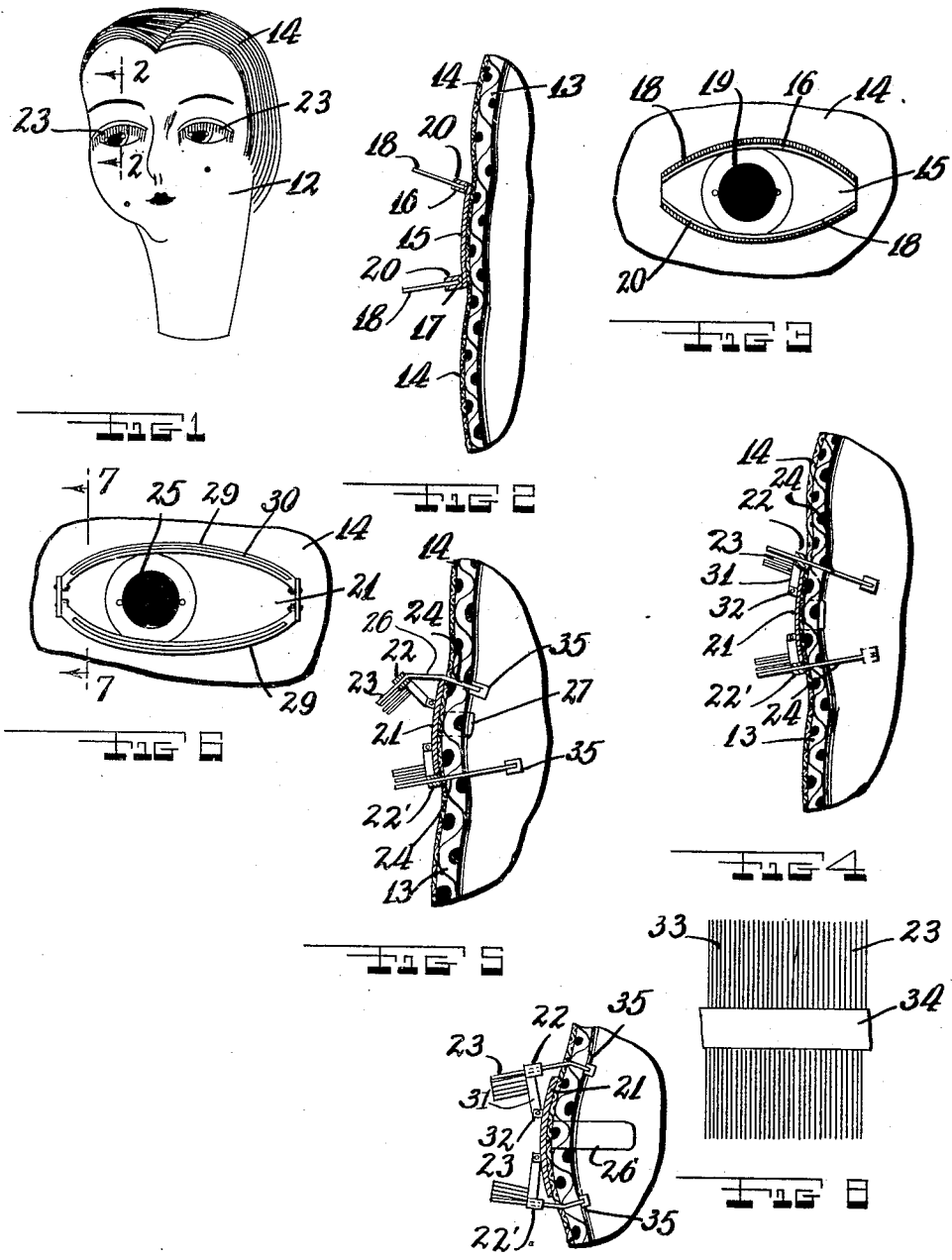
INVENTOR.
Victor Keney
BY
ATTORNEY Patented Mar. 17, 1931

1,796,997

UNITED STATES PATENT OFFICE

VICTOR KENEY, OF NEW YORK, N. Y.

COMBINED EYE AND EYELASHES FOR DOLLS

Application filed February 20, 1930. Serial No. 429,841.

This invention relates to new and useful improvements in a combination eye and eye lashes for dolls.

The invention has for an object the provision of a device of the class mentioned which is of simple, durable construction, dependable in use and efficient in action, and which can be manufactured and sold at a reasonable cost.

The invention proposes in combination with a doll's head consisting of a fabric and form, an eye ball plate attached on the eye portion of the fabric for simulating one eye and formed with projecting upper and lower lash support elements, and eye lashes attached on said elements.

The invention also proposes in combination with a doll's head having slits over its eyes extending thru a fabric and form constituting the doll's head, an eye ball plate attached on the eye portion of the doll's head for simulating one eye, an eye lash support member pivotally mounted on said plate, and eye lashes for said support member constituting the eye lashes of the eye and extending thru the slit in the doll's head for holding the support member in various positions and thus the outer ends of the lashes in angularly adjusted positions.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a perspective view of a doll's head constructed according to this invention.

Fig. 2 is a fragmentary enlarged sectional view taken on the line 2—2 of Fig. 1.

Fig. 3 is a fragmentary enlarged front elevational view of one of the eyes shown in Fig. 1.

Fig. 4 is a view similar to Fig. 2, but illustrating a modification.

Fig. 5 is a view of Fig. 4 showing some of the parts in a different position.

Fig. 6 is a front elevational view of the eye shown in Fig. 4.

Fig. 7 is a fragmentary sectional view taken on the line 7—7 of Fig. 6.

Fig. 8 is an enlarged fragmentary detailed view of a portion of the eye lash hair strands shown in Fig. 5.

On the drawing a doll's head 12 has been illustrated and consists of an inner form 13 and an outer fabric 14 glued upon the form and painted or otherwise finished to simulate the features of the doll. The combination eye and eye lash for the doll's head consists of an eye ball plate 15 attached upon the eye portion of the fabric 14 for simulating one eye and formed with projecting upper and lower lash support elements 16 and 17 respectively, and lashes 18 attached on said support elements 16 and 17.

The lash support elements are of arcuate shape when viewed from the front as may be seen in Fig. 3 for simulating the curvature as naturally appears in these elements upon a doll's head. The eye ball plate is glued or otherwise secured onto the fabric 14 or directly onto the doll form 13, constituting the method of attaching. The eye ball plate 15 is convexed and the pupil 19 of an eye is painted upon its front face. Instead of painting the eye on the eye plate 15, a glass, celluloid or an eye of any suitable material may be secured on the eye plate. The eye lashes 18 are secured together at their inner ends by tape 20 and this tape is glued upon the upper sides of the lash support elements.

In the form of the device shown in Figs. 4 to 8 inclusive, the combination eye and eye lash consists of an eye ball plate 21 attached upon the eye portion of the doll's head for simulating one eye, an eye lash support member 22 pivotally mounted on said plate 21, and eye lashes 23 in said support member constituting the lashes of the eye and extending thru a slit 24 formed in the doll's head directly over its eyes for holding the support member 22 in various positions and thus the outer ends of the lashes in angularly adjusted positions.

The eye ball plate 21 is of almond shape when viewed from the front as may be seen from an inspection of Fig. 6 for simulating one's eye and is also convexed. A pupil 25 is painted upon the front of the eye ball member. Lugs 26 project rearwards from the ends of the eye ball plate 21 and engage thru slots in the doll's head, and have their inner ends 27 bent laterally for constituting the means for attaching the eye ball plate upon the doll's head.

The drawing shows upper and lower eye lash support members 22 and 22' respectively for representing the upper and lower lids. Each of the support members consists of a portion 29 of a shape to snugly engage against the plate member 21 and formed with a slit 30 extending its full length for receiving and holding the lashes 23. Lugs 31 project from the portions 29 at both of its ends and pivotally connect with lugs 32 projecting from the plate 21.

The lashes 23 extend thru the slots 24 and provide sufficient friction for holding the eye lash support members in various pivotal positions into which they are manually forced. In Fig. 4 they are shown flat against the fabric 14, and in Fig. 5 the upper support member is shown in a front position. It should be noticed that the inclination of the eye lashes 23 may thus be varied.

The eye lashes 23 consist of a row of hair strands 33 secured together in a line intermediate of their ends by tape 34. The inner ends of the hair strands extend thru the slots 24 and tape members 35 are attached to the inner ends within the form 13 for preventing complete displacement of the hair strands from the slots. The tape 34 is engaged within the slits 30 of the portions 29.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In combination with a doll's head having slits over its eyes, a knitted fabric and form thru which the slots extend and constituting the doll's head, an eye ball plate attached on the eye portion of the doll's head for simulating one eye, an eye lash support member pivotally mounted on said plate, eye lashes in said support member constituting the eye lashes of the eye and extending thru the slit in the doll's head, and means for holding the support member in various positions and thus the outer ends of the lashes in angularly adjusted positions.

2. In combination with a doll's head having slits over its eyes, a knitted fabric and form thru which the slots extend and constituting the doll's head, an eye ball plate attached on the eye portion of the doll's head for simulating one eye, an eye lash support member pivotally mounted on said plate, eye lashes in said support member constituting the eye lashes of the eye and extending thru the slit in the doll's head, and means for holding the support member in various positions and thus the outer ends of the lashes in angularly adjusted positions, and the attachment of the eye ball plate upon the doll's head consisting of lugs projecting from both ends of the eye ball plate and engaging thru openings in the form and having their inner ends bent laterally.

3. In combination with a doll's head having slits over its eyes, a knitted fabric and form thru which the slots extend and constituting the doll's head, an eye ball plate attached on the eye portion of the doll's head for simulating one eye, an eye lash support member pivotally mounted on said plate, eye lashes in said support member constituting the eye lashes of the eye and extending thru the slit in the doll's head and means for holding the support member in various positions and thus the outer ends of the lashes in angularly adjusted positions, and said eye lash support member being provided with lugs pivotally connected with lugs on said eye ball plate and constituting the pivotal mounting.

4. In combination with a doll's head having slits over its eyes, a knitted fabric and form thru which the slots extend and constituting the doll's head, an eye ball plate attached on the eye portion of the doll's head for simulating one eye, an eye lash support member pivotally mounted on said plate, eye lashes in said support member constituting the eye lashes of the eye and extending thru the slit in the doll's head, and means for holding the support member in various positions and thus the outer ends of the lashes in angularly adjusted positions, and said eye lashes frictionally extending thru the slit in the doll's head.

In testimony whereof I have affixed my signature.

VICTOR KENEY.